United States Patent
Morishita et al.

(10) Patent No.: US 7,367,041 B2
(45) Date of Patent: Apr. 29, 2008

(54) INFORMATION COMPRESSING AND RECORDING DEVICE

(75) Inventors: Taichiro Morishita, Nara (JP); Takeshi Shigemori, Osaka (JP); Seiichi Senoo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1518 days.

(21) Appl. No.: 09/908,648

(22) Filed: Jul. 20, 2001

(65) Prior Publication Data

US 2002/0009289 A1      Jan. 24, 2002

(30) Foreign Application Priority Data

Jul. 21, 2000   (JP)   .............. 2000-220293

(51) Int. Cl.
*H04N 7/025* (2006.01)
*H04N 5/445* (2006.01)
*H04N 5/91* (2006.01)
*H04N 7/26* (2006.01)

(52) U.S. Cl. .................. 725/37; 725/58; 725/142; 386/83; 386/95; 386/109

(58) Field of Classification Search ............. 386/109, 386/110, 111, 112, 95, 83; 725/37, 58, 142
See application file for complete search history.

(56) References Cited

U.S. PATENT DOCUMENTS 6,389,538 B1 *  5/2002  Gruse et al. ............... 713/194

7,242,852 B2 *  7/2007  Sawada ...................... 386/111

FOREIGN PATENT DOCUMENTS

JP   10-92106      4/1998
JP   11-205740   *  7/1999

* cited by examiner

*Primary Examiner*—Vincent F. Boccio
(74) *Attorney, Agent, or Firm*—Birch, Stewart, Kolach & Birch, LLP

(57) ABSTRACT

When TV images are inputted as video data through a channel selected by the first inputting means, the video information including audio information is compressively encoded at a specified compression coding ratio by a compression coding portion, provided with a compression coding ratio statement attached thereto by the compression definition data adding portion and recorded on a recording portion at the specified compression ratio specified by the compression coding control portion. An electronic program guide overlaid on TV signal, which includes genre information, is input to a second information inputting means, decoded by a second information decoding portion and stored as data. The compression coding ratio is set in a setting table with reference to the data by a compression coding ratio control portion.

14 Claims, 15 Drawing Sheets

FIG.7

| RESERVATION | ✕ |

DO SETTING FOR RESERVATION

INFORMATION FOR RESERVATION

| START TIME | APRIL 27 (THUS) ▼ | 15 ▲▼ O'CLOCK | 0 ▲▼ MIN. |
| ENDING TIME | APRIL 27 (THUS) | 15 ▲▼ O'CLOCK | 37 ▲▼ MIN. |
| CHANNEL | 50CH KEINA TV ▼ | | |
| PROGRAM CONTENT | [S]XXHELTHTV[REBROADCAST] SENOO ··· | | |

RECORDING METHOD

FORMAT  [HIGH IMAGE QUALITY ▼]   [CHANGE ORIGINAL QUALITY]

[ OK ]   [ CANCEL ]

FIG.11

| GENRE | LONG-TIME RECORDING MODE | | STANDARD MODE | | HIGH QUALITY MODE | |
|---|---|---|---|---|---|---|
| | RECORDING RATE | RESOLUTION | RECORDING RATE | RESOLUTION | RECORDING RATE | RESOLUTION |
| DRAMA | 1/2D1 | 2Mbps | FullD1 | 4Mbps | FullD1 | 8Mbps |
| MOVIE | FullD1 | 3Mbps | FullD1 | 4Mbps | FullD1 | 8Mbps |
| SPORTS | 1/2D1 | 3Mbps | 1/2D1 | 4Mbps | FullD1 | 8Mbps |
| ENTERTAINMENTS | 1/2D1 | 2Mbps | FullD1 | 4Mbps | FullD1 | 8Mbps |
| MUSIC | 1/2D1 | 2Mbps | FullD1 | 4Mbps | FullD1 | 8Mbps |
| VARIETY SHOW | 1/2D1 | 2Mbps | 1/2D1 | 4Mbps | FullD1 | 8Mbps |
| EDUCATION | 1/2D1 | 2Mbps | FullD1 | 4Mbps | FullD1 | 8Mbps |
| ANIMATION | 1/2D1 | 2Mbps | 1/2D1 | 4Mbps | FullD1 | 8Mbps |
| NEWS AND REPORTS | 1/2D1 | 3Mbps | 1/2D1 | 4Mbps | FullD1 | 8Mbps |
| HOBBIES | 1/2D1 | 2Mbps | FullD1 | 4Mbps | FullD1 | 8Mbps |
| OTHERS | 1/2D1 | 2Mbps | 1/2D1 | 4Mbps | FullD1 | 8Mbps |

FIG.14

| GENRE | CLASSIFICATION CODES | CLASSIFICATION |
|---|---|---|
| (1) TV DRAMAS | A1 | JAPANESE |
|  | A2 | FOREIGN |
| (2) MOVIES | B1 | JAPANESE |
|  | B2 | FOREIGN |
| (3) SPORTS | C1 | SOCCER |
|  | C2 | BASEBALL |
|  | C3 | SUMO |
|  | C4 | OTHERS |
| (4) ENTERTAINMENTS | D1 | COMIC BACKCHAT |
|  | D2 | KABUKI |
|  | D3 | OTHERS |
| (5) MUSIC | E1 | POPULAR SONG |
|  | E2 | CLASSICAL |
|  | E3 | OTHERS |
| (6) VARIETY SHOWS | F1 | QUIZ SHOW |
|  | F2 | OTHERS |
| (7) EDUCATION | G1 | SCIENCE |
|  | G2 | HISTORY |
|  | G3 | OTHERS |
| (8) ANIMATION | H1 | ANIMATION |
|  | H2 | PUPPET SHOW |
| (9) NEWS AND REPORTS | I1 | REPORT |
|  | I2 | POLITIC DEBATE |
|  | I3 | NEWS |
|  | I4 | ECONOMY |
|  | I5 | OTHERS |
| (10) HOBBIES | J1 | TRAVEL |
|  | J2 | HEALTH |
|  | J3 | COOKING |
|  | J4 | OTHERS |
| (11) OTHERS | K1 | SHOPPING |
|  | K2 | OTHERS |

FIG.15

| | CHANNEL | START DAY | START TIME | END DAY | END TIME | CONTENTS | RECORDING MODE | RECORDING RATE | RESOLUTION |
|---|---|---|---|---|---|---|---|---|---|
| VIDEO RECORDING1 | 50ch | 2000/4/27 | 15:00 | 2000/4/27 | 25:37:00 | XXHEALTTV | HIGH Q | FullD1 | 8Mbps |
| VIDEO RECORDING2 | | | | | | | | | |
| VIDEO RECORDING3 | | | | | | | | | |
| VIDEO RECORDING4 | | | | | | | | | |
| VIDEO RECORDING5 | | | | | | | | | |
| VIDEO RECORDING6 | | | | | | | | | |
| VIDEO RECORDING7 | | | | | | | | | |
| VIDEO RECORDING8 | | | | | | | | | |
| VIDEO RECORDING9 | | | | | | | | | |
| VIDEO RECORDING10 | | | | | | | | | |

INFORMATION COMPRESSING AND RECORDING DEVICE

BACKGROUND OF THE INVENTION

The present invention relates to a information recording device for recording video data compressed by using a high-efficiently encoding technique such as the video compression method according to MPEG (Moving Picture Experts Group) standard related to motion video. More specifically, this invention relates to data recording devices and video recording/reproducing devices, which can record video data at an optimal compression coding ratio on a recording area of a recording portion, allowing users to freely set a video data compression coding ratio in video recording operation without considering the quality of finally recorded images.

Conventional video recording devices, which can change a data compression coding ratio by using the MPEG algorithm, allow users to select any data compression coding ratio so that the recorded images may have a desirable quality and the data may be reduced to a desirable extent. However, these two parameters "desirable recorded image quality" and "desirable recording capacity" are in the trade-off relation, which are usually determined by each user by means of manually setting a desirable compression coding ratio.

Japanese Laid-Open Patent Publication No. 10-92106 discloses a video recording device capable of automatically selecting a data compression-coding ratio by determining it from the reserved program recording time. This is achieved by optimizing a compression coding ratio of coded data representing each of programs in timer recording reservation list based on a remaining storage capacity of a recording medium, a recording time and recording quality requirement preset in a timer recording reservation information, aiming at obtaining possibly higher quality of the recorded images.

Video information usually contains a large amount of information, e.g., a series of 30 still images per second and therefore must be compressed by the MPEG coding method to record on a recording medium such as a hard disc which is expensive and has a limited storage capacity.

Video compression methods such as the MPEG method, may achieve higher compression coding ratios by correspondingly decreasing the quality of reproducible images. Therefore, applications using the video compression algorithm usually allow users to select a desirable compression-coding ratio. It is therefore desirable to automate the user's manual operation of selecting the compression coding ratio in such a way that an optimal value is automatically determined and set, achieving an improved efficiency of recording the video data.

Japanese Laid-Open Patent Publication No. 10-92106 discloses a video recording device capable of automatically determining a compression-coding ratio based on a remaining capacity of a recording medium. The device can automatically change a compression coding ratio of data so that all programs reserved in advance for recording by timer may be recorded on a limited storage area of a recording medium with a least decrease in the quality of reproduced images with priority specified by a user. However, the device still requires the user to manually select a target compression coding ratio for each of programs to be recorded by timer.

The video compression coding method such as the MPEG algorithm can compress information by reducing redundancies in image data due to spatial correlation and temporal correlation and hence it may not select a high compression coding ratio for video sequences with essentially low redundancies of data, i.e., complex images and intensive motion scenes. The complex images and intensive motion scenes are generally included in a certain genre program such as a sport program, which, if encoded with a high compression coding ratio, may suffer considerable degradation of the reproduced images.

On the contrary, news programs containing a relatively small quantity of complex images and intensive motion scenes and hence may be recorded at a high compression coding ratio with small effects of the quality of reproduced images.

SUMMARY OF THE INVENTION

An object of the present invention is to provide an information compressing and recording device in which the recording quality of a video program is selected as a data compression coding ratio selectable from reference values provided for respective genre and content of programs, thus enabling users to easily record any desirable program with high quality and effectively use a recording medium.

Another object of the present invention is to provide an information compressing and recording device provided with a first information inputting means for inputting first information including images and sounds, a second information inputting means for inputting second information to supplement the first information, a compression coding ratio setting table for determining a compression coding ratio of the first information, a second information decoding portion for decoding the second information inputted to the second information decoding portion, a compression coding ratio control portion for retrieving in the compression coding ratio setting table by using a part of the decoded second information, determining the compression coding ratio of the first information and controlling the compression coding of the first information, a compression coding portion for compressively encoding the first information under the control of the compression coding control portion, and a compression definition data adding portion, wherein the first information compressed by the compression coding portion is provided with the compression definition data attached to the first information by the compression definition data adding portion and then recorded on a recording portion.

Another object of the present invention is to provide an information compressing and recording device, wherein the compression coding ratio setting table is comprising categories of the first information as specified by the second information and compression coding ratio setting information, a compression coding ratio most adaptive to each of the categories is determined by the compression coding ratio setting table and the inputted first information is compressed by a compression coding ratio most adaptive to each of the categories of the first information and recorded on the recording portion.

Another object of the present invention is to provide an information compressing and recording device, wherein a compression coding ratio setting table is settable for each of the categories of the first information specified by the second information through a compression coding ratio setting inputting portion.

Another object of the present invention is to provide an information compressing and recording device, wherein the category of the first information specified by the second information is classified to genre such as news, music and movie, and video compression coding ratios in the compression coding ratio setting table are determined to be higher for genre mainly consisting audio information and to be lower for genre mainly consisting of image information.

Another object of the present invention is to provide an information compressing and recording device, wherein a compression coding ratio in the compression coding ratio setting table is determined by selecting any of plural recording rates and any of plural resolution levels.

Another object of the present invention is to provide an information compressing and recording device, wherein the first information is video image such as TV program and the second information is program guide information transmitted as overlaid on the first information.

A further object of the present invention is to provide an information compressing and recording device, which is further provided with a genre recording setting means for conducting the setting for each genre program and a program recording setting means for conducting the setting for each program, wherein the genre recording setting means determines a compression coding ratio referring to the compression coding ratio table and the program recording setting means can separately set a compression coding ratio for each program.

A still further object of the invention is to provide an information compressing and recording device, wherein in case of setting time shift video recording other than a reserved video recording setting, a compression coding ratio can be specified for the time shift video recording and time shift video information can be recorded at the specified compression coding ratio.

Another object of the invention is to provide an information compressing and recording device, wherein in case of recording a program set to be recorded in the time shift mode and in the reserved video recording mode, the program is recorded with priority of compression coding ratio set for reserved video recording.

BRIEF DESCRIPTION OF THE DRAWINGS

FIG. 7 is a screen image for setting reserved recording of a program, which is used with the procedure of FIG. 3.

FIG. 11 illustrates an example of a compression coding ratio setting table containing optimal compression coding conditions.

FIG. 14 is a detailed classification coding of the electronic TV program guide of FIG. 13.

FIG. 15 illustrates an exemplary content of a table of recorded programs.

PREFERRED EMBODIMENTS OF THE PRESENT INVENTION

Preferred embodiments of the present invention will be described below with reference to the accompanying drawings.

Figure 1:
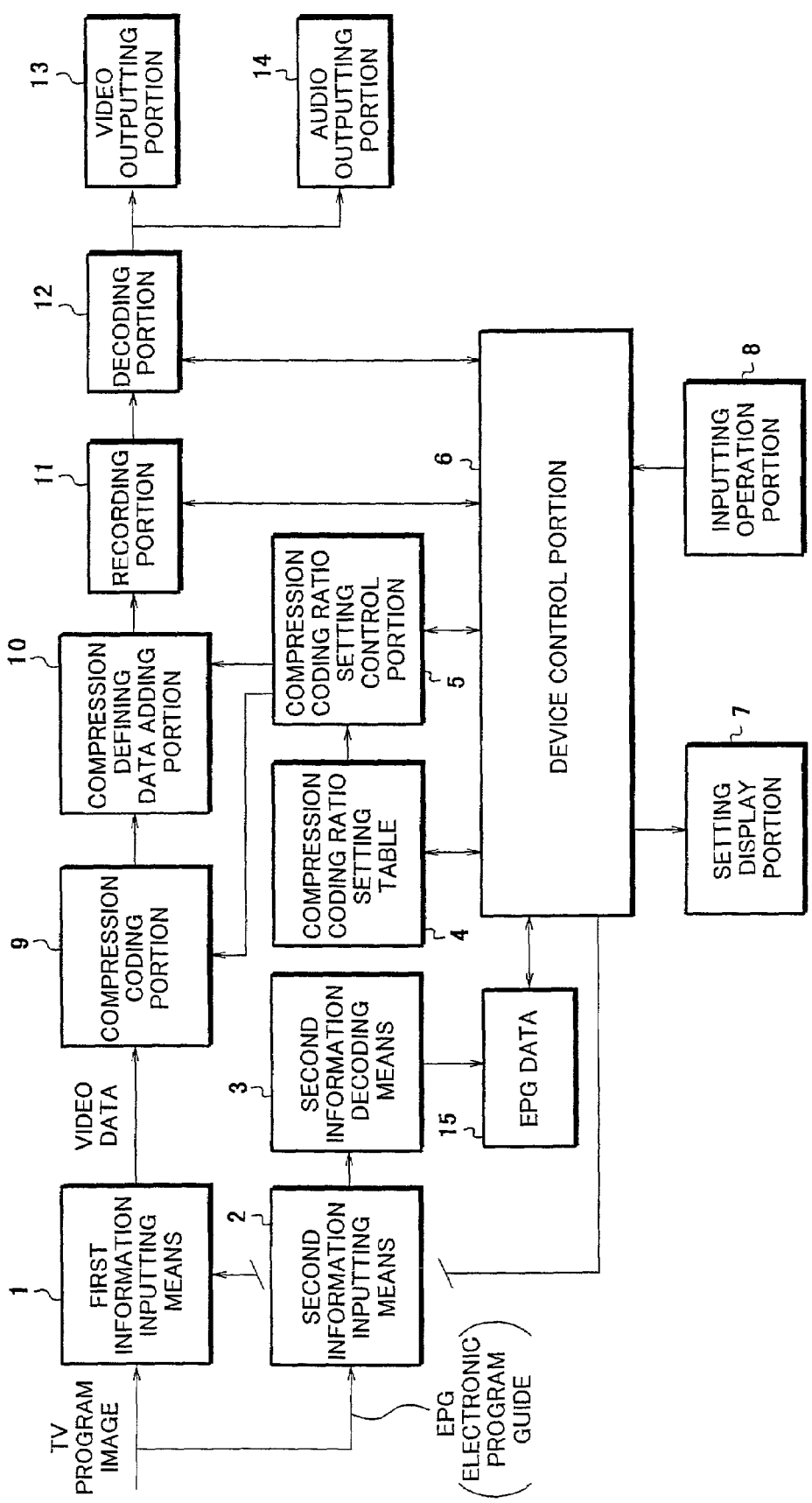
FIG. 1 is a construction block diagram of an information compressing and recording device according to an embodiment of the present invention.

FIG. 1 is a construction block diagram of an information compressing and recording device according to an embodiment of the present invention.

In FIG. 1, an input television image selected by specifying a TV channel by a first inputting means is input as video data and the video and audio information compressed at a specified compression coding ratio is prepared by a compression coding portion 9. The compressed coded A/V information with a statement of the compressed coding ratio added thereto by a compression definition data adding portion 10 is recorded on a recording portion 11 on the conditions specified by a compression coding ratio control portion 5.

An electronic program guide (hereinafter referred to as EPG) overlaid on a vertical blanking area of a TV image signal is input to a second information inputting means 2 that in turn a second information decoder 3 decodes the EPG and stores it as EPG data 15 in the device.

In determining a compression coding ratio of video data, a compression coding ratio control portion 5 is driven to prepare a compression coding ratio setting table 4 referring to the EPG data 15 and determine a compression coding ratio adapted to the state of video data being input to the device.

In other words, the compression coding portion 9 and the compression definition data adding portion 10 under the control of the compression coding control portion 5 cooperate to prepare compressed data at an optimal compression coding ratio and record the compressed data on the recording portion 11.

Consequently, in reproducing operation, a video signal read from the recording portion 11 is decoded by a decoding portion 12 and the reproduced video data and audio data are output from a video outputting portion 13 and an audio outputting portion 14 respectively.

The control of a whole system is conducted by a device control portion 6. The compression coding ratio setting table 4 is set by selecting parameters in the content displayed on a screen by a setting display portion 7 through the input control portion 8.

Figure 13:
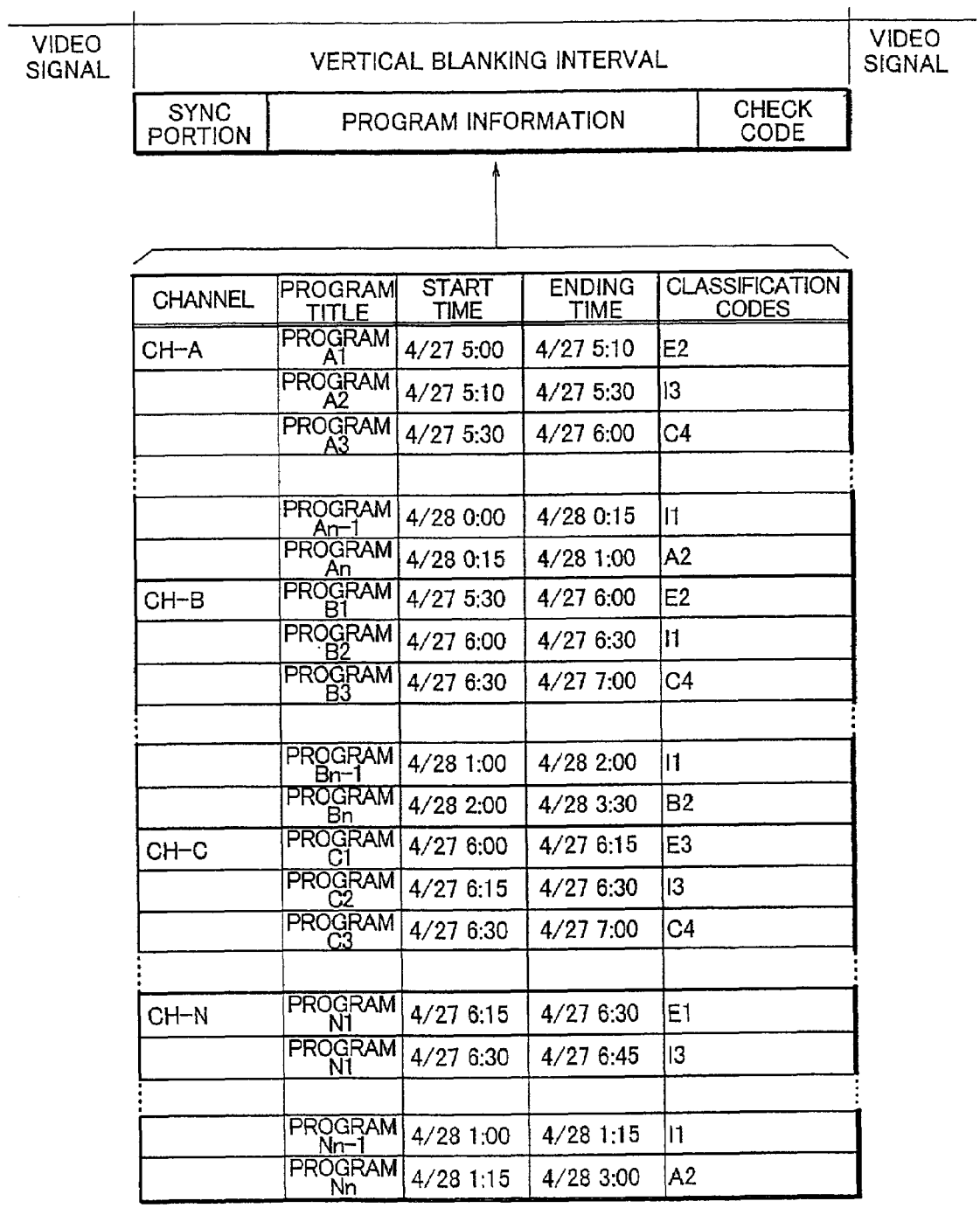
FIG. 13 is a schematic view for explaining data of an EPG (electronic program guide) transmitted as overlaid along with television image signals.

FIG. 13 is a schematic view for explaining EPG data transmitted as overlaid on a vertical blanking interval of a TV video signal.

As shown in FIG. 13, the EPG is arranged on a vertical blanking interval of a TV video signal as sandwiched between a synchronizing portion and a check code portion.

The EPG contains information on programs to be broadcast for a several days, wherein each program is indicated with its channel name, title, start time, ending time, classification code and content information (not shown).

FIG. 14 shows details of classification codes shown in FIG. 13.

The broadcast programs can be classified by genre for example into Japanese drama and foreign drama as shown in FIG. 14. 11 kinds of genre (e.g., dramas, movies, hobbies and others) are given respective classification codes A1 to K2.

FIG. 11 shows an example of the compression coding ratio setting table 4 in which recommendable compression coding conditions are provided for each of 11 kinds (genre) of TV programs.

As shown in FIG. 11, the table 4 indicates 11 genre (codes) "Dramas", "Movies", "sports", "entertainment", "music", "variety shows", "Education", "Animations", "News and Reports", "Hobbies" and "Others" in title column, each of which is provided with initial values for long-time recording mode, standard mode and high-quality mode. Initial values of recording rate and resolution are predetermined for the respective modes.

The compression coding ratio setting table 4 shown in FIG. 11 is used in the process of setting for recording/time shift recording (described later) by the information compressing and recording device according to the embodiment of the present invention.

Figure 10:
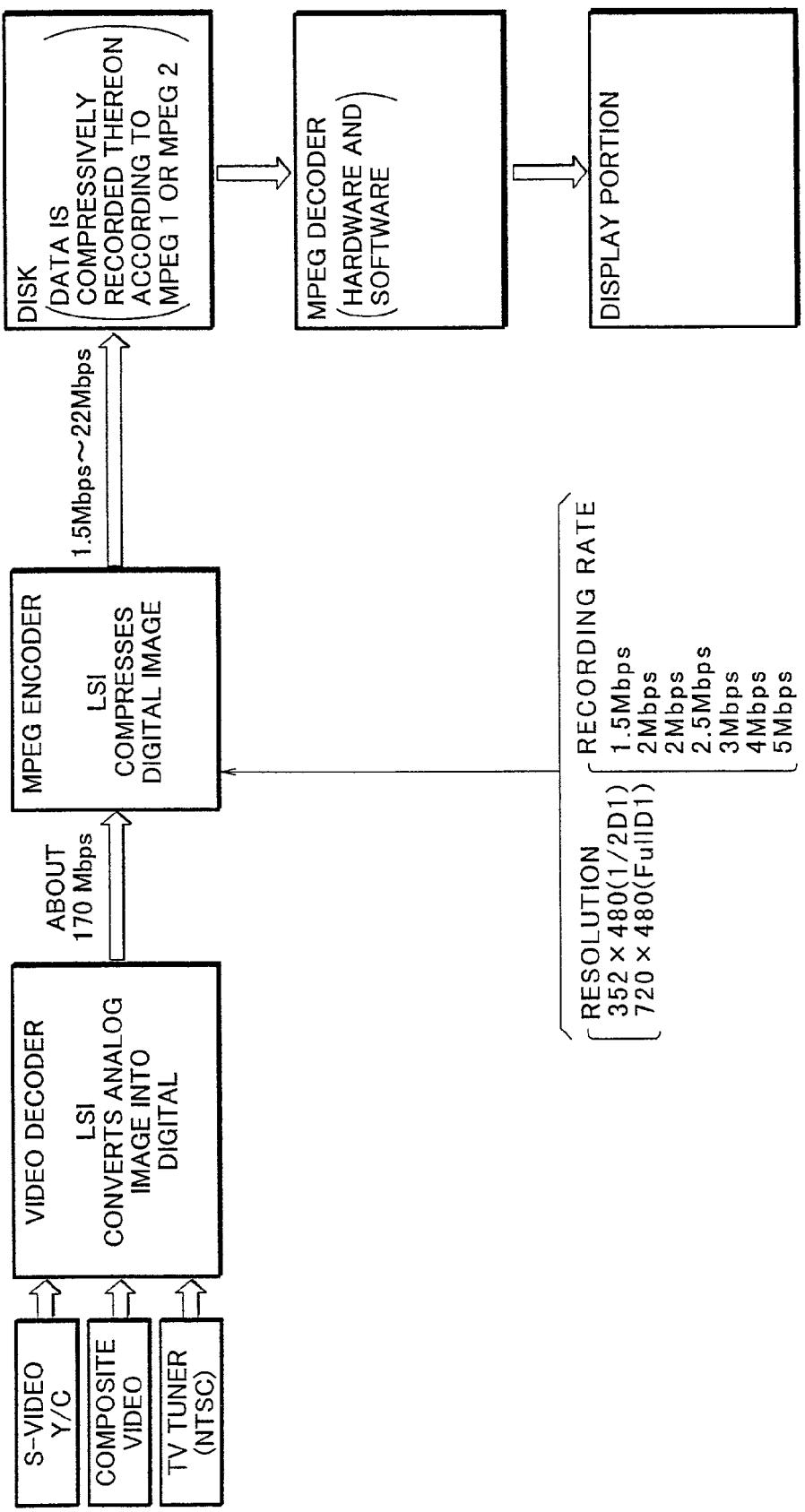
FIG. 10 is a view for explaining the compression coding control of a MPEG video compression type video recorder to which an information compressing and recording device according to the present invention is applied.

FIG. 10 is a view depicting the control of compression coding process in the video compression recording/reproducing device based on MPEG coding algorithm, in which the information compressing/recording system of the present invention is applied.

Referring to FIG. 10, the compression coding process is described as follows:

A video decoder together with a TV tuner composes the first information inputting means 1 shown in FIG. 1.

The video decoder (the first information inputting means 1) converts analog video signals (analog image signals) such as a TV tuner signal and a composite signal into digital video information (digital image information) to be encoded by the compression coding portion 9 (FIG. 1) and outputs video information of about 170 Mbps.

The digital video information from the video decoder are input to a MPEG encoder which in turn converts the size of the digital information to the resolution specified in the compression coding ratio setting table 4 of FIG. 1 and outputs the information encoded at the recording rate specified in the same table 4. This process corresponds to that carried out by the compression coding portion 9 and the compression coding ratio control portion 5.

A MPEG encoder also attaches the resolution data and recording rate data to the coded video (image) information, which corresponds to the operation of the compression definition adding portion 10 shown in FIG. 1.

Figure 12:
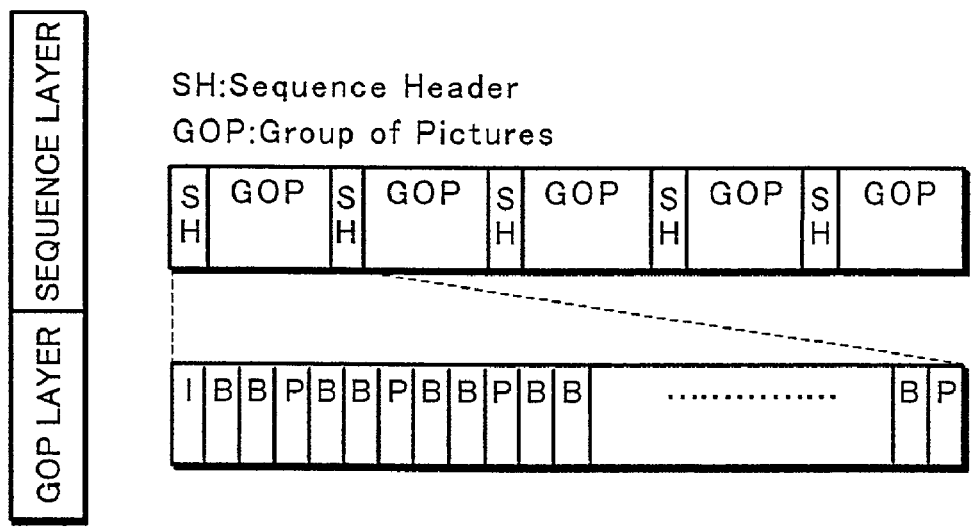
FIG. 12 is a schematic view for explaining a video part structure according to the MPEG standard.

FIG. 12 schematically illustrates the structure of a video part of the MPEG standard.

The process of adding the resolution data and the recording rate data to the coded image information is described by way of example on the MPEG video part structure of FIG. 12, wherein a GOP (group of pictures) corresponding to the coded image information is provided with a sequence header (SH) including the resolution data and the recording rate data. Referring to the resolution data and the recording rate data in the header, the decoding portion 12 of FIG. 1 can correctly decode the coded information so that the decoded information may has the same resolution as that of the original information before having been compressively encoded.

The decoded data is transferred to the display portion wherefrom it is output as image information. The operation of the information compressing and recording device according to the present invention will be described below with reference to FIG. 2 where is shown a flowchart illustrating the essential processing procedure.

Once the electric power is applied to the information compressing/recording device, its television function is switched on and, at the same time, time shift recording of a TV program on a temporary memory starts according to the initially set data (Step S201).

The time shift function is to always store compressed TV pictures and speeches for a certain period, thus enabling a user to view later the information that he or she could not see or forgot viewing in time.

In the time shift mode and the usual recording mode, any AV program is recorded on the recording portion according to compression coding algorithm such as MPEG.

When the time shift recording or the video recording requires setting of a compression coding ratio, the presence or absence of the video recording/time shift settings is first examined (Step S202). If the compression coding ratio is needed to set for the recording portion, a setting function for the video recording/time shift recording is driven to carry out necessary processing (Step S208). The setting procedure for the video recording/time shift recording is described later in detail.

If no setting of video recording/time shift recording is required, the presence of a setting request for reserved video recording is checked (Step S203). If there is a request for reservation setting, the procedure for setting the reserved video recording is carried out (Step S209).

If no setting is required, checking is made whether there is a request for starting the video recording (Step S204). To start the video recording, the procedure proceeds to Step S210. If starting the video recording is not needed, further checking is made whether a TV channel was selected (Step S205). If another channel is selected, the current channel is switched over to the selected one (Step S214).

If starting the video recording was decided in Step S204, a compression coding ratio is extracted and set (Step S210) and the compressed video information with the compression coding ratio data attached thereto is recorded on the recording portion (Step S211). In Step S212, checking is made whether the video recording ends. In Step S213, checking is made whether the video recording is stopped. The video recording continues until the recording time ends or the recording is stopped.

The processing may be repeated until the power is switched OFF (Step S206). In Step S207, the processing for turning off the power supply is performed to finish the operation of the information compressing and recording device.

Figure 3:
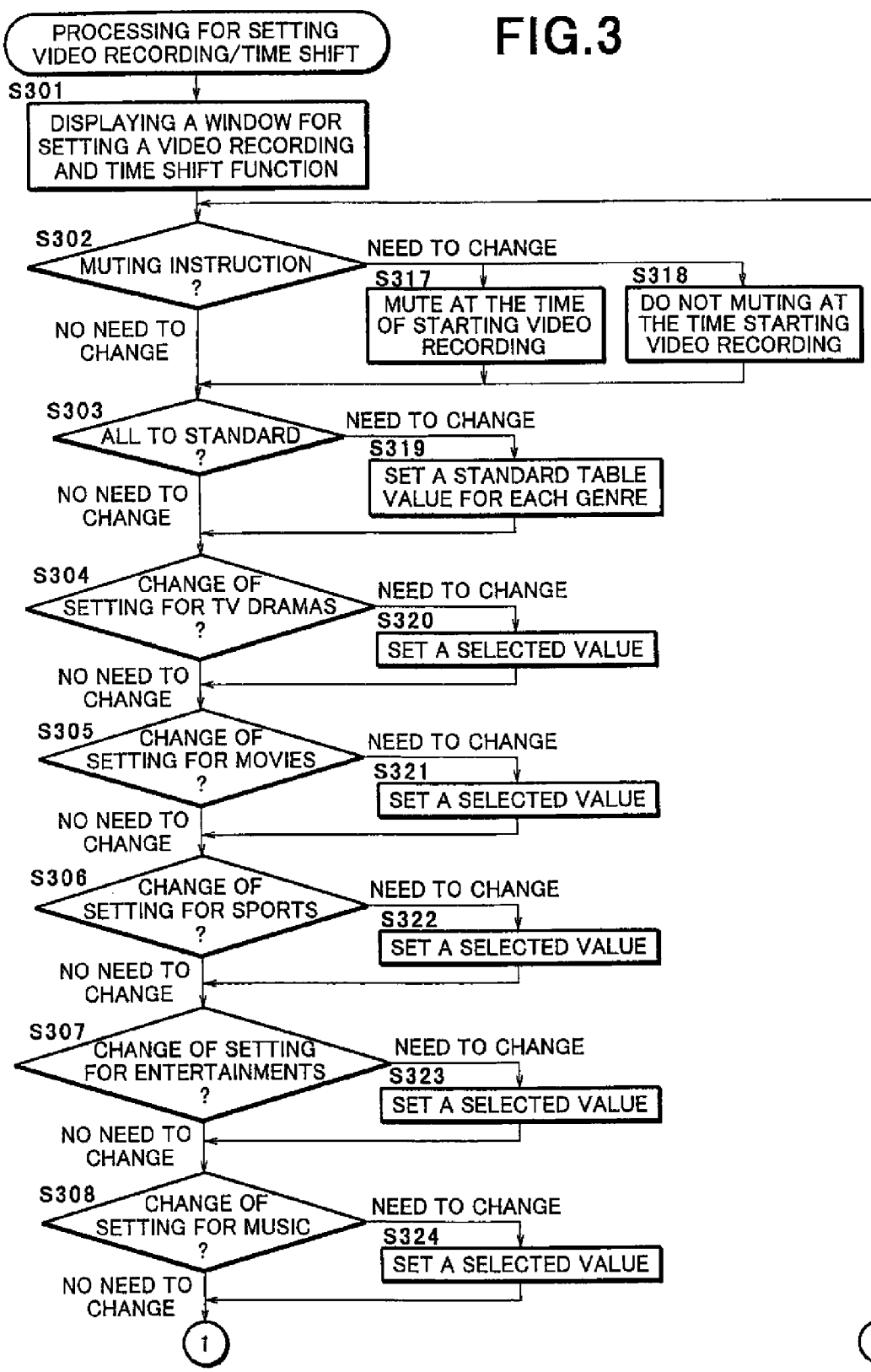
FIG. 3 is a flowchart depicting a detailed setting procedure for recording according to each genre of programs and time shift recording, which is a part of the flowchart of FIG. 2.
Figure 4:
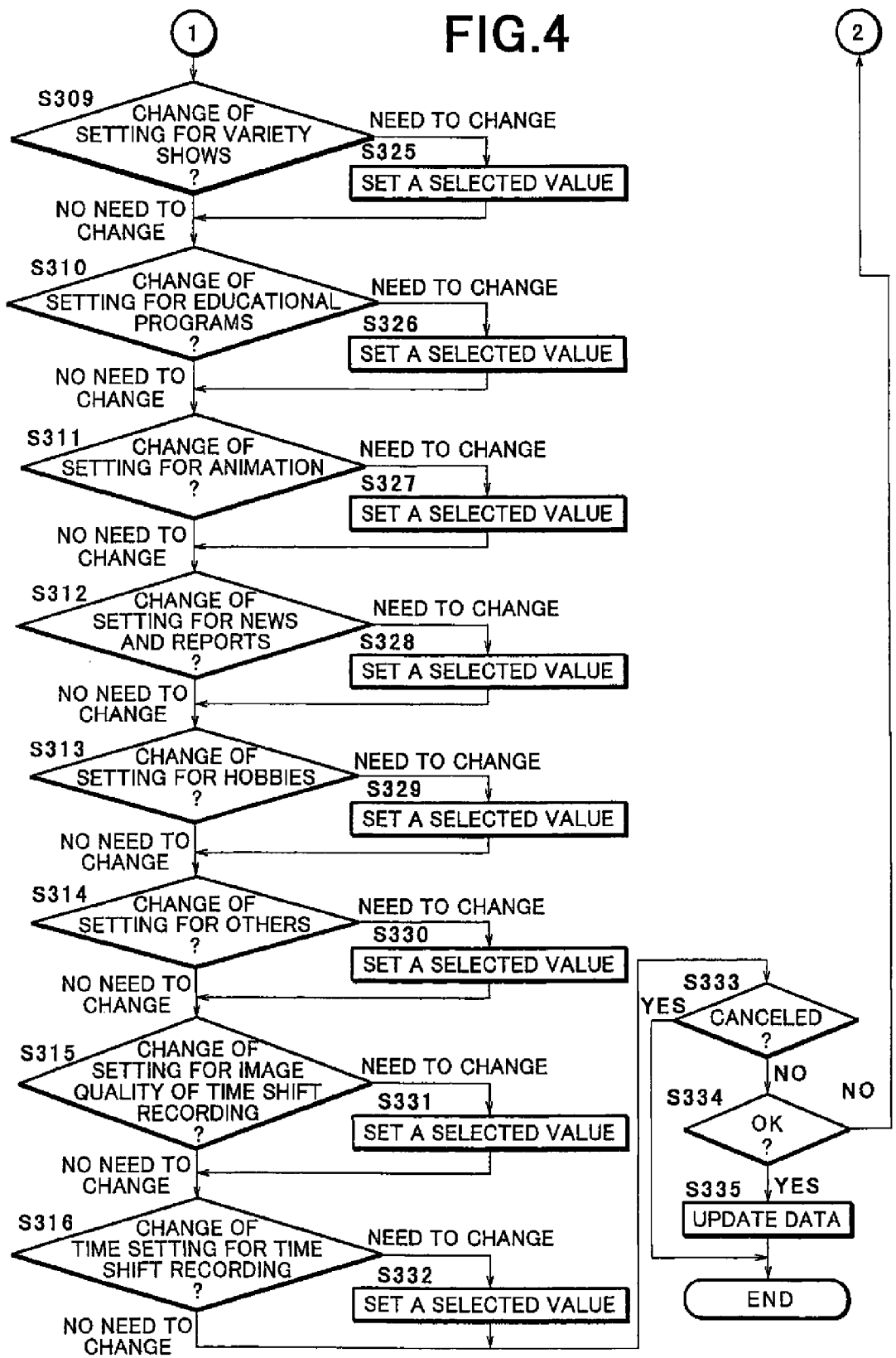
FIG. 4 is a flowchart that is the continuation of the flowchart of FIG. 3.
Figure 5:
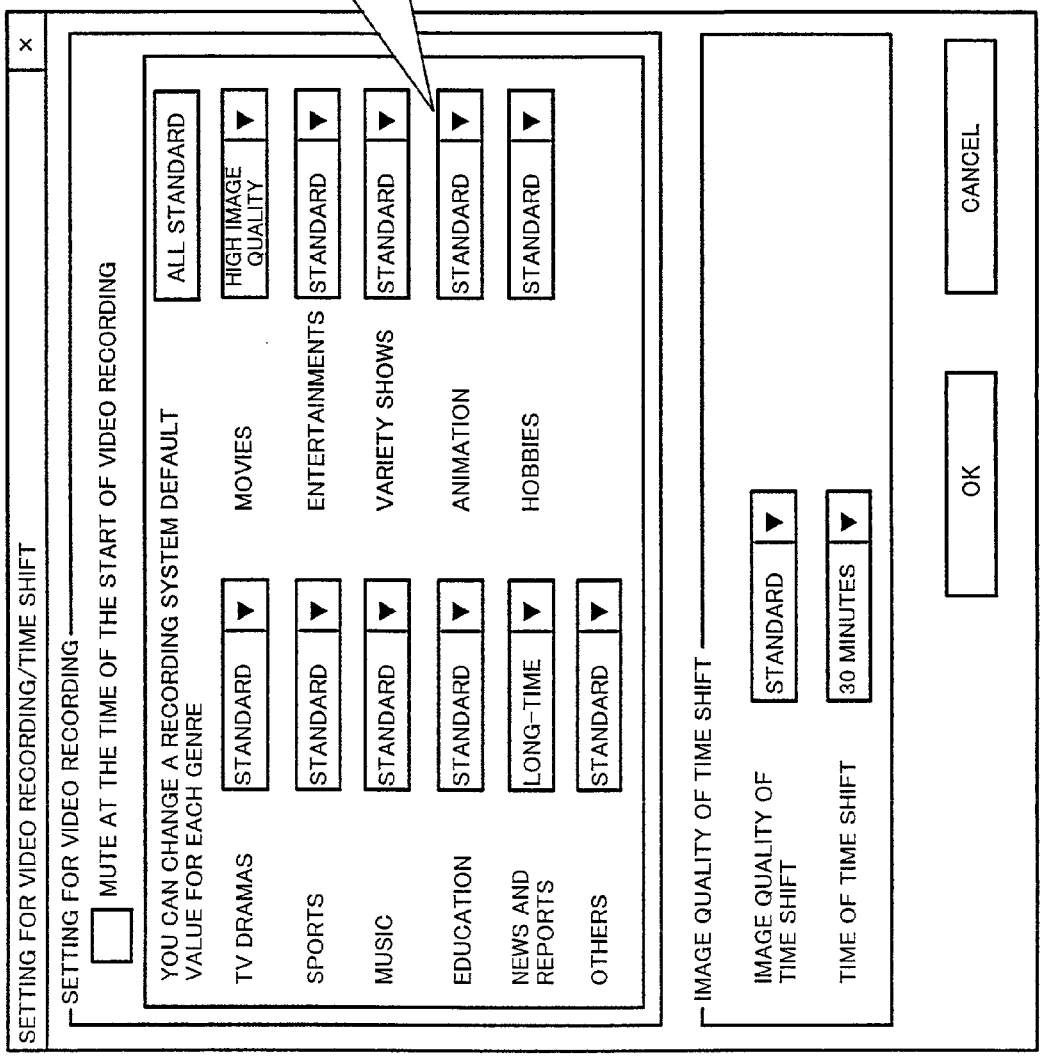
FIG. 5 is a screen image for setting recording condition for each genre and a time shift recording condition, which is used with the procedure of FIG. 3.

FIGS. 3 and 4 are flowcharts depicting in detail a procedure of setting the video recording and the time shift function. FIG. 5 shows an exemplary screen image for the setting operation.

Referring to the operation display screen of FIG. 5, the procedure of setting video recording and time shift function is described below according to the flowcharts of FIGS. 3 and 4.

In FIG. 5, the device presents a window for setting the video recording and time shift function on the display screen (Step S301) and then checks whether the respective current settings are requested to change (Steps S302 to S316). If any setting is required to change, the device changes the setting to a desired value.

In Step S302, the device checks whether the muting instruction is given or not. If the muting instruction is effective, the muting is selected (Step S317). If not, the setting is changed not to use the muting function.

Next, the device checks whether an instruction "all to standard" is given (Step S303). If the instruction is given, the values preset before shipping the device are maintained or set again (Step S319). If changing instructions were found in Steps S304 (Setting for drama) to S314 (Setting for others), respective setting conditions are determined in Steps S320 to S330, which are used for preparing a compression coding ratio setting table as shown in FIG. 11.

Similarly, when a changing instruction is given in respect to the image quality (Step S315) and the time length (Step S316) of the time shift, new conditions are determined (Steps S331 and S332) and the settings are discriminated whether they are canceled or not (Step S333) and applied or not (Step S334). If they are confirmed to be applicable, the data is updated (Step S335) and the procedure is finished. If the new conditions were canceled in Step S333, the procedure ends without updating the data.

Figure 2:
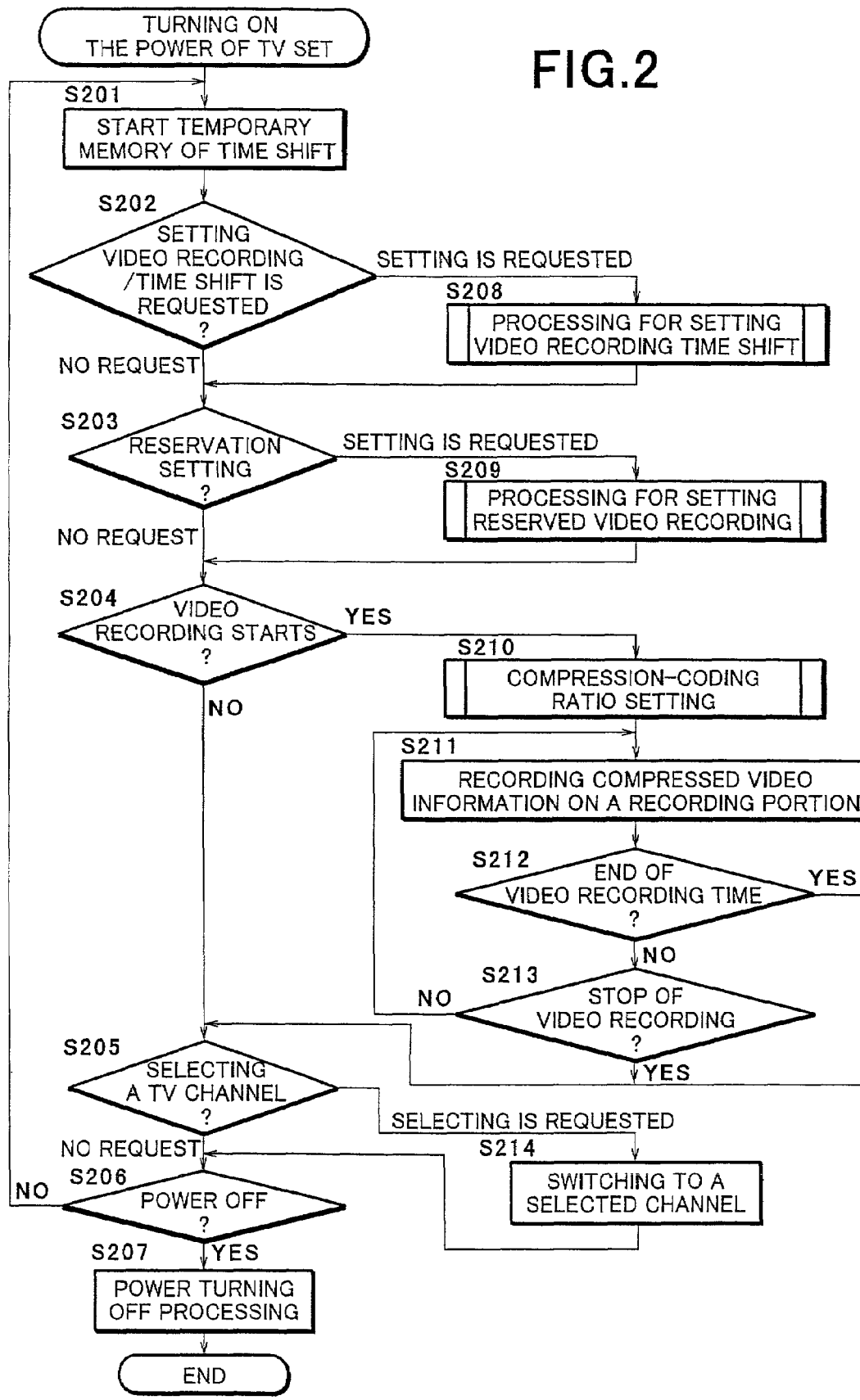
FIG. 2 is a flowchart depicting an essential procedure of an information compressing and recording device according to the present invention.
Figure 6:
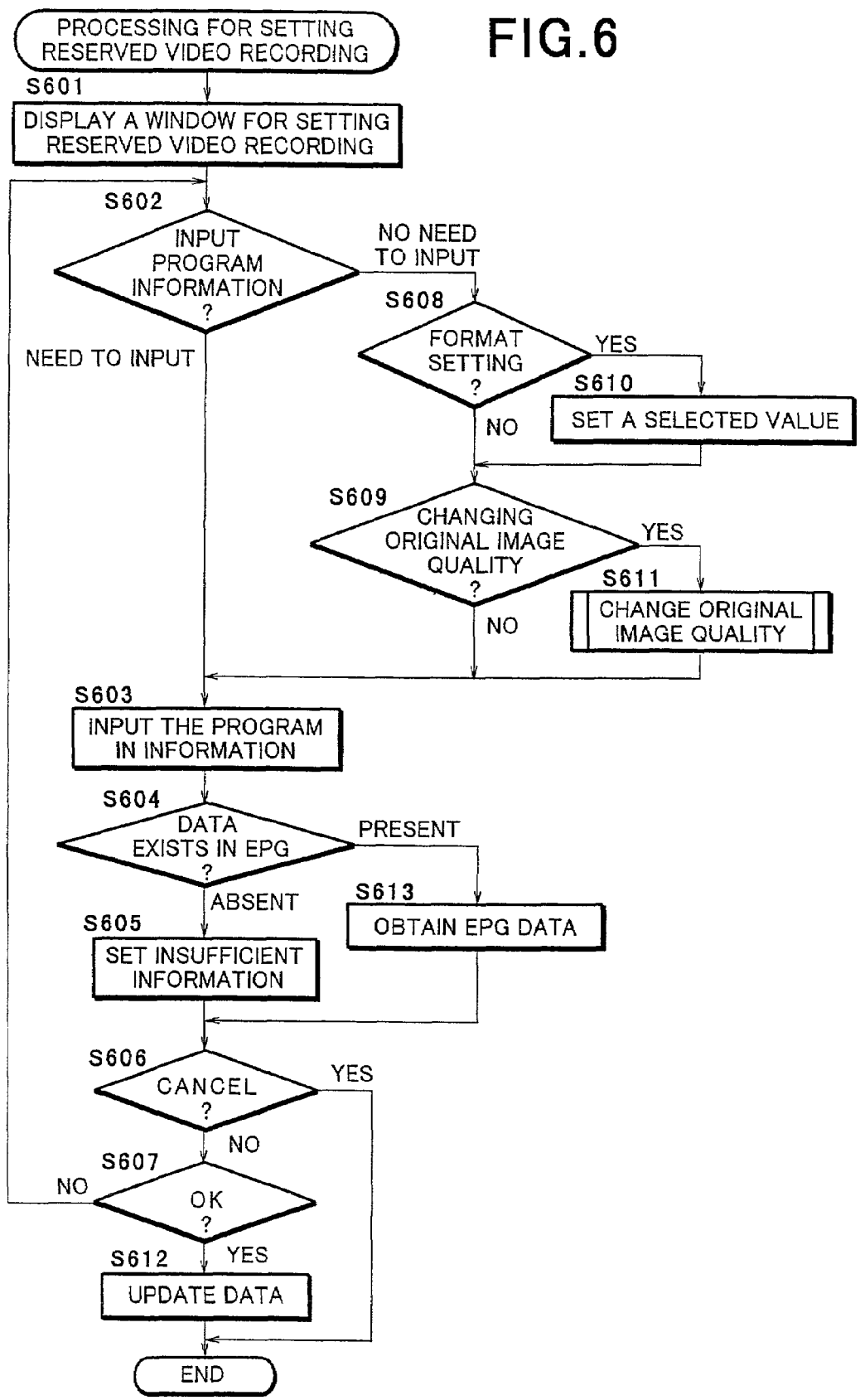
FIG. 6 is a flowchart depicting a detailed procedure for setting reserved recording of a program, which is a part of the flowchart of FIG. 2.

FIG. 6 is a flowchart depicting a detailed procedure for setting the reserved video recording at Step S209 of FIG. 2. FIG. 7 shows an exemplary display screen image for use in executing the procedure.

Referring to the display screen image of FIG. 7, the procedure for setting the reserved video recording is described below according to the flowchart of FIG. 6.

The device first presents a window for setting the reserved video recording on the display screen of FIG. 7 (Step S601) and then checks whether TV-program information is input (Step S602). With the TV-program information, the device inputs a necessary part of the program information (Step S603) and checks whether the information contains the electronic program guide (EPG) data as shown in FIG. 1 (Step S604). If so, the EPG data is obtained (Step S613). If not, the device obtains lacking information (Step S605) and then discriminates whether the information must be canceled or applied (Step S607) and discriminates the information must be O.K. or not (Step S607). When the input information is not canceled and no trouble is found, the reserved video recording data (including newly input data) is updated.

If the settings were canceled in Step S606, the procedure ends without updating the data.

A recorded program table is prepared.

FIG. 15 shows an example of a prepared table of programs to be recorded.

If no program information is input in Step S602, the device determines whether the recording format is set (Step S608). If setting is selected, the table of FIG. 15 is filled with setting data including the recording mode selected out of "Long recording mode", "Standard mode" and "High-quality mode" (Step S610) and the recording rate and resolution level selected with reference to the compression coding ratio setting table of FIG. 11.

Next, the original image quality is checked whether it is needed to change (Step S609) and, if necessary, it is changed (Step S611).

Figure 8:
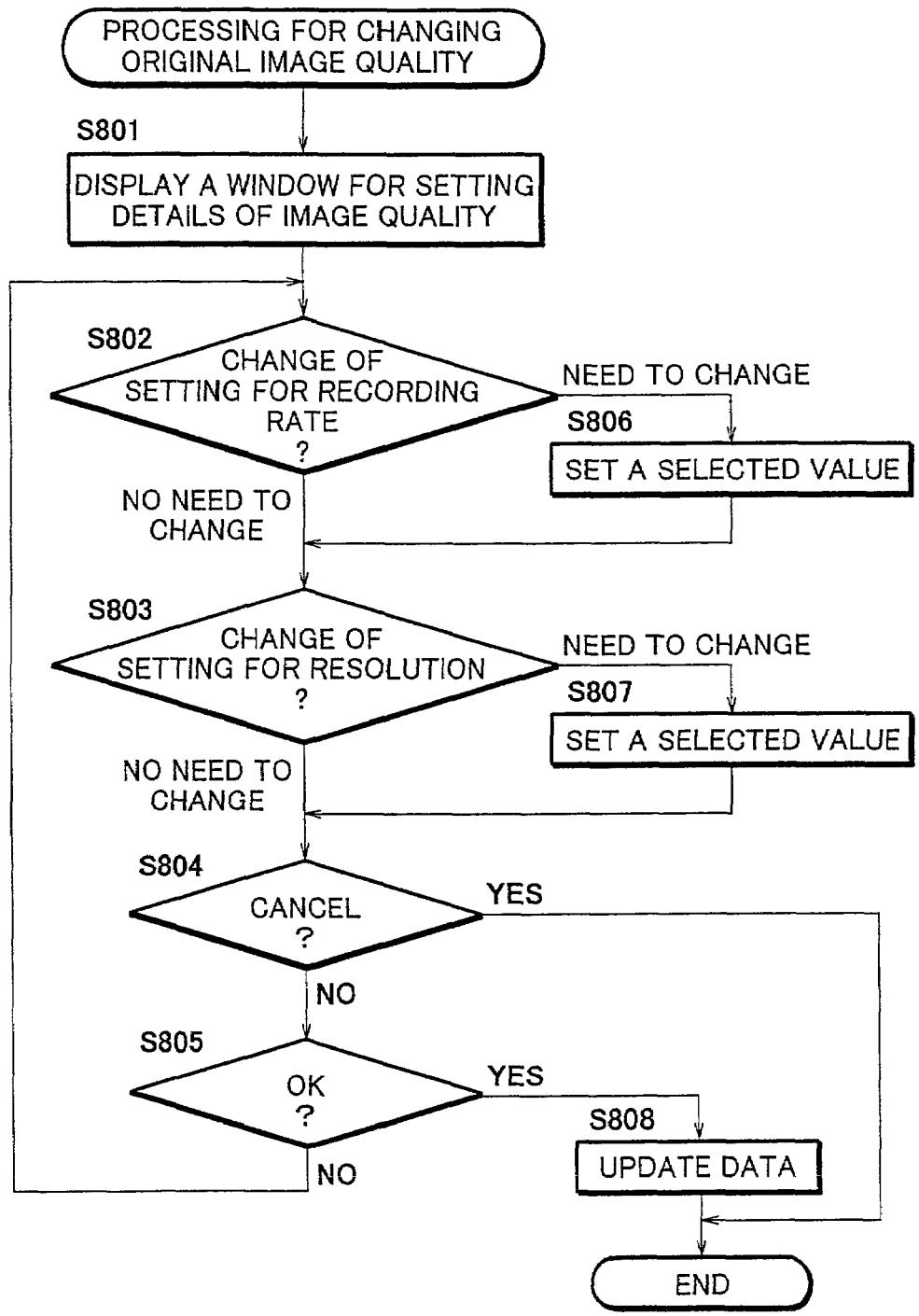
FIG. 8 is a flowchart depicting a detailed procedure for changing the original image quality, which is a part of the flowchart of FIG. 6.
Figure 9:
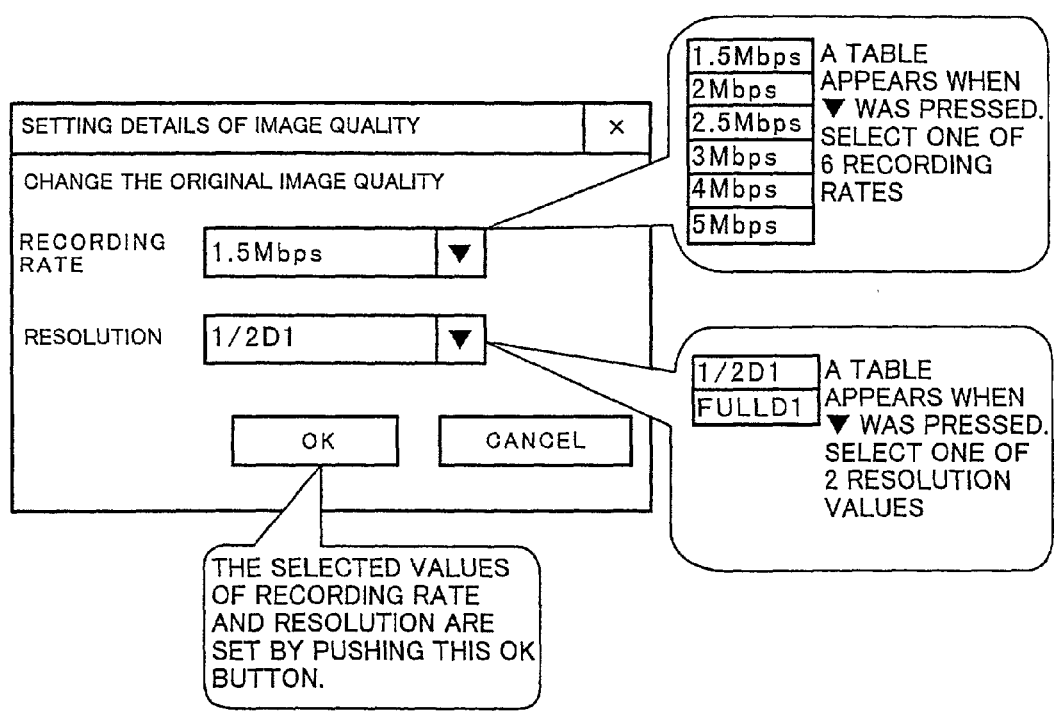
FIG. 9 illustrates a screen image for operating of changing the original image quality, which is used for the processing of FIG. 8.

FIG. 8 is a flowchart depicting a detailed procedure for changing the original image quality at Step S611 of FIG. 6. FIG. 9 shows an exemplary display screen image to be used in executing the same procedure.

Referring to the display screen image of FIG. 9, the procedure for changing the original image quality is described below according to the flowchart of FIG. 8.

The device first presents a window for setting details of the image quality on the display screen of FIG. 9 (Step S801) and then checks whether the recording rate is needed to change (Step S802). If the need be, a value of recording rate in the range from 1.5 Mbps to 5 Mbps is selected and set (Step S806).

The device checks whether the resolution is needed to change (Step S803). If the need be, one of options "1/2D1" and "FULLD1" is selected and set (Step S807). "1/2D1" and "FULLD1" are nominal resolution which is in practice represented by the number of dots displayed on a display screen and expressed by a set of X-axis value and Y-axis value as shown in FIG. 10.

The settings are judged whether they must be canceled or not (Step S804) and applied or not (Step S805). When the set values are not canceled and no problem is found, the data is updated (Step S808) and the procedure ends.

Updating data in Step S808 makes it possible to enter in the video recording table (FIG. 15) the recording rate values and the resolution values other than the standard values as shown in FIG. 11. For actual recording of a TV program, based on the table of FIG. 15, the MPEG encoder can compressively encode input video information at the resolution level and recording rate specified in the compression coding ratio setting table as described before with reference to FIG. 10.

According to compression standard defined in the video part of MPEG1 or MPEG2 (see FIG. 12), the compressed video information with compression definition data added thereto is recorded on the recording portion. The compressed recorded image can be decoded based on resolution and recording rate specified in the compression definition data added thereto, thus the original video can be reproduced.

The resolution and the compression coding ratio are determined in accord with the genre information shown in the EPG, enabling the adaptive control of recording a TV program at the optimal compression coding ratio.

For the time shift recording function, the image quality of recorded programs can be specified but cannot be managed according to the classification of genre of programs. When recording a TV program, the time shift recording function may usually be ineffective to work in order to avoid double recording the same program.

The present invention offers the following advantageous effects:

In the information compressing and recording device according to the present invention, information to supplement the first information such as a video sequence of a TV program and genre of the program are obtained from the second information (program guide information) inputted as overlaid on the first information and the first information is recorded at an optimal compression coding ratio set in the compression coding ratio setting table. Owing to this, the compression coding ratio is automatically set in such a way that an artistic video information requiring the high image quality can be recorded at an decreased compression coding ratio to maintain the high quality of the reproduced information whereas a video information not requiring the high image quality can be recorded at an increased compression coding ratio not to use excessively the limited capacity of the storage portion. Thus, the input video information can be encoded at a compression coding ratio adapted to maintain the image quality level desired by the user and then recorded effectively on the recording portion, maintaining the image (video) quality not giving unnatural feeling to the viewer.

The compression coding ratio setting table can provide recommendable values as initial set values therein and allows the user to set values selected by own preference. Thus, the table can reflect user's requirements for image quality levels.

The compression coding ratio can be selected for each of respective input TV programs. This enables recording a TV program at any desired compression coding ratio other than the standard. Flexible compression coding ratio setting is thus realized.

In the viewing conditions outside the video recording time zones, time shifted temporary recording of past AV information and reproduction of the same with a certain time interval from there can be conducted with any of selectable compression coding ratios. This may improve the audio-visual conditions of the time shifted mode.

The invention of claimed is:

1. An information compressing and recording device provided with a first information inputting means for inputting first information including images and sounds, a second information inputting means for inputting second information to supplement the first information, a compression coding ratio setting table for determining a compression coding ratio of the first information, a second information decoding portion for decoding the second information inputted to the second information decoding portion, a compression coding ratio control portion for retrieving in the compression coding ratio setting table by using a part of the decoded second information, determining the compression coding ratio of the first information and controlling the compression coding of the first information, a compression coding portion for compressively encoding the first information under the control of the compression coding control portion, and a compression definition data adding portion, wherein the first information compressed by the compression coding portion is provided with the compression definition data attached to the first information by the compression definition data adding portion and then recorded on a recording portion, wherein in case of recording a program set to be recorded in a time shift mode and in a reserved video recording mode, the program is recorded with priority of compression coding ratio set for reserved video recording.

2. An information compressing and recording device as defined in claim 1, wherein the compression coding ratio setting table is comprising categories of the first information as specified by the second information and compression coding ratio setting information, a compression coding ratio most adaptive to each of the categories is determined by the compression coding ratio setting table and the inputted first information is compressed by a compression coding ratio most adaptive to each of the categories of the first information and recorded on the recording portion.

3. An information compressing and recording device as defined in claim 2, wherein a compression coding ratio setting table is settable for each of the categories of the first information specified by the second information through a compression coding ratio setting inputting portion.

4. An information compressing and recording device as defined in claim 1, wherein the category of the first information specified by the second information is classified to genre including news, music and movie, and video compression coding ratios in the compression coding ratio setting table are determined to be higher for genre mainly consisting audio information and to be lower for genre mainly consisting of image information.

5. An information compressing and recording device as defined in claim 4, wherein a compression coding ratio in the compression coding ratio setting table is determined by selecting any of plural recording rates and any of plural resolution levels.

6. An information compressing and recording device as defined in claim 1, wherein the first information is video image including TV program and the second information is program guide information transmitted as overlaid on the first information.

7. An information compressing and recording device as defined in claim 4, which is further provided with a genre recording setting means for conducting the setting for each genre program and a program recording setting means for conducting the setting for each program, wherein the genre recording setting means determines a compression coding ratio referring to the compression coding ratio table and the program recording setting means can separately set a compression coding ratio for each program.

8. An information compressing and recording device provided with a first information inputting means for inputting first information including images and sounds, a second information inputting means for inputting second information to supplement the first information, a compression coding ratio setting table for determining a compression coding ratio of the first information, a second information decoding portion for decoding the second information inputted to the second information decoding portion, a compression coding ratio control portion for retrieving in the compression coding ratio setting table by using a part of the decoded second information, determining the compression coding ratio of the first information and controlling the compression coding of the first information, a compression coding portion for compressively encoding the first information under the control of the compression coding control portion, and a compression definition data adding portion, wherein the first information compressed by the compression coding portion is provided with the compression definition data attached to the first information by the compression definition data adding portion and then recorded on a recording portion, wherein in case of setting time shift video recording other than a reserved video recording setting, a compression coding ratio can be specified for the time shift video recording and time shift video information can be recorded at the specified compression coding ratio.

9. An information compressing and recording device as defined in claim 8, wherein the compression coding ratio setting table is comprising categories of the first information as specified by the second information and compression coding ratio setting information, a compression coding ratio most adaptive to each of the categories is determined by the compression coding ratio setting table and the inputted first information is compressed by a compression coding ratio most adaptive to each of the categories of the first information and recorded on the recording portion.

10. An information compressing and recording device as defined in claim 9, wherein a compression coding ratio setting table is settable for each of the categories of the first information specified by the second information through a compression coding ratio setting inputting portion.

11. An information compressing and recording device as defined in claim 8, wherein the category of the first information specified by the second information is classified to genre including news, music and movie, and video compression coding ratios in the compression coding ratio setting table are determined to be higher for genre mainly consisting audio information and to be lower for genre mainly consisting of image information.

12. An information compressing and recording device as defined in claim 11, wherein a compression coding ratio in the compression coding ratio setting table is determined by selecting any of plural recording rates and any of plural resolution levels.

13. An information compressing and recording device as defined in claim 8, wherein the first information is video image including TV program and the second information is program guide information transmitted as overlaid on the first information.

14. An information compressing and recording device as defined in claim 11, which is further provided with a genre recording setting means for conducting the setting for each genre program and a program recording setting means for conducting the setting for each program, wherein the genre recording setting means determines a compression coding ratio referring to the compression coding ratio table and the program recording setting means can separately set a compression coding ratio for each program.

\* \* \* \* \*